United States Patent
Min et al.

(10) Patent No.: US 9,407,803 B2
(45) Date of Patent: Aug. 2, 2016

(54) MOBILE TERMINAL AND CONTROLLING METHOD THEREOF

(71) Applicant: LG ELECTRONICS INC., Seoul (KR)

(72) Inventors: Dongog Min, Seoul (KR); Younghak Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/597,061

(22) Filed: Jan. 14, 2015

(65) Prior Publication Data

US 2015/0207970 A1 Jul. 23, 2015

(30) Foreign Application Priority Data

Jan. 17, 2014 (KR) ........................ 10-2014-0005966

(51) Int. Cl.

| | |
|---|---|
| H04N 7/14 | (2006.01) |
| H04N 5/45 | (2011.01) |
| H04N 5/225 | (2006.01) |
| H04N 5/232 | (2006.01) |
| H04N 21/414 | (2011.01) |
| H04N 21/4223 | (2011.01) |
| H04N 21/431 | (2011.01) |
| H04N 21/443 | (2011.01) |
| H04N 5/262 | (2006.01) |
| H04N 101/00 | (2006.01) |

(Continued)

(52) U.S. Cl.
CPC ......... *H04N 5/2258* (2013.01); *H04N 5/23216* (2013.01); *H04N 5/23219* (2013.01); *H04N 5/23293* (2013.01); *H04N 5/2621* (2013.01); *H04N 5/45* (2013.01); *H04N 7/144* (2013.01); *H04N 7/147* (2013.01); *H04N 21/41407* (2013.01); *H04N 21/4223* (2013.01); *H04N 21/4316* (2013.01); *H04N 21/4438* (2013.01); *H04N 21/4325* (2013.01); *H04N 21/4334* (2013.01); *H04N 21/4788* (2013.01); *H04N 2007/145* (2013.01); *H04N 2101/00* (2013.01)

(58) Field of Classification Search
CPC ............ H04N 5/2258; H04N 5/23293; H04N 5/23216; H04N 5/23219; H04N 5/45; H04N 7/147; H04N 7/144; H04N 2101/00
USPC ........... 348/14.07, 231.99; 386/224; 455/420; 715/234, 838, 864; 257/750; 345/2.2, 345/173

See application file for complete search history.

(56) References Cited

U.S. PATENT DOCUMENTS

| | | | | |
|---|---|---|---|---|
| 8,584,043 B2 * | 11/2013 | Cho | ..................... | G06F 3/04817 715/814 |
| 8,661,369 B2 * | 2/2014 | Heo | ...................... | G06F 3/0481 340/10.1 |

(Continued)

*Primary Examiner* — Gerald Gauthier
(74) *Attorney, Agent, or Firm* — Lee, Hong, Degerman, Kang & Waimey; Jonathan Kang; Harry Lee

(57) ABSTRACT

A mobile terminal and controlling method thereof are disclosed, which facilitates a terminal to be used in further consideration of user's convenience. The present invention includes a first camera, a second camera, a touchscreen, and a controller, if the first and second cameras are activated, outputting a first preview screen for the first camera through the touchscreen, the controller outputting a second preview screen for the second camera to a prescribed region having a first shape in the outputted first preview screen, the controller changing the first shape into a second shape based on an image received through at least one of the first camera and the second camera. Accordingly, an image can be effectively photographed or a video call can be effectively performed, using front and rear cameras.

14 Claims, 17 Drawing Sheets

(51) Int. Cl.
*H04N 21/432* (2011.01)
*H04N 21/433* (2011.01)
*H04N 21/4788* (2011.01)

(56) References Cited

U.S. PATENT DOCUMENTS

| | | | | |
|---|---|---|---|---|
| 9,000,592 B1* | 4/2015 | Lee | H01L 27/1225 | |
| | | | 257/43 | |
| 9,082,235 B2* | 7/2015 | Lau | G07C 9/00 | |
| 9,128,544 B2* | 9/2015 | Chun | G06F 3/041 | |
| 9,172,867 B2* | 10/2015 | Yoon | H04N 5/335 | |
| 9,172,905 B2* | 10/2015 | Song | H04N 7/141 | |
| 9,196,156 B2* | 11/2015 | Cho | G06F 3/017 | |
| 2012/0282914 A1* | 11/2012 | Alexander | H04M 1/72527 | |
| | | | 455/420 | |
| 2013/0063380 A1* | 3/2013 | Wang | G06F 3/04883 | |
| | | | 345/173 | |
| 2013/0305189 A1* | 11/2013 | Kim | G06F 3/0482 | |
| | | | 715/838 | |
| 2014/0108915 A1* | 4/2014 | Lu | G06F 17/2247 | |
| | | | 715/234 | |
| 2014/0192232 A1* | 7/2014 | Park | H04N 5/76 | |
| | | | 348/231.99 | |
| 2015/0194186 A1* | 7/2015 | Lee | H04N 5/772 | |
| | | | 386/224 | |
| 2015/0207970 A1* | 7/2015 | Min | H04N 5/2258 | |
| | | | 348/14.07 | |
| 2016/0026321 A1* | 1/2016 | Yeo | G06F 3/0416 | |
| | | | 345/173 | |
| 2016/0026425 A1* | 1/2016 | Lee | G06F 3/0416 | |
| | | | 345/2.2 | |

* cited by examiner

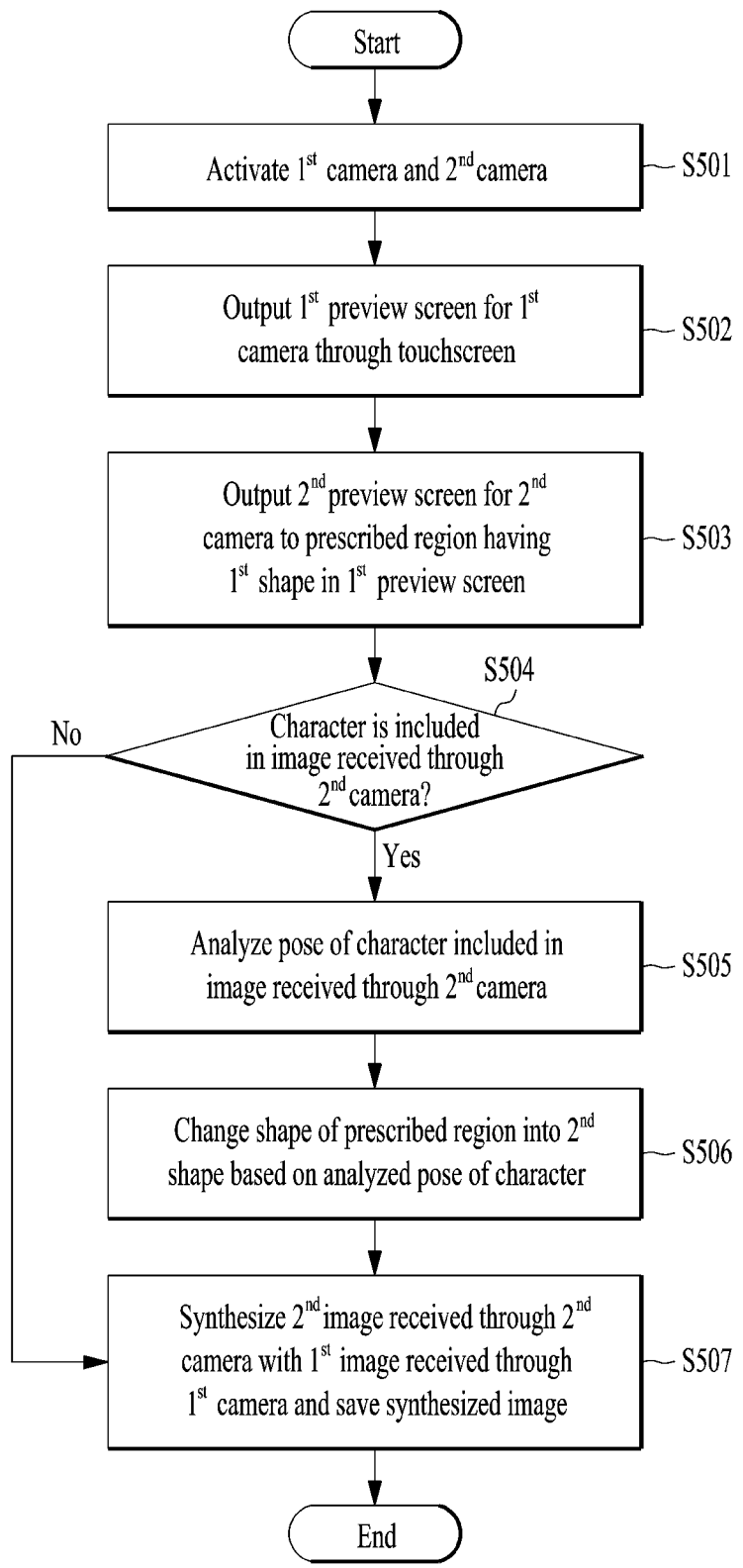

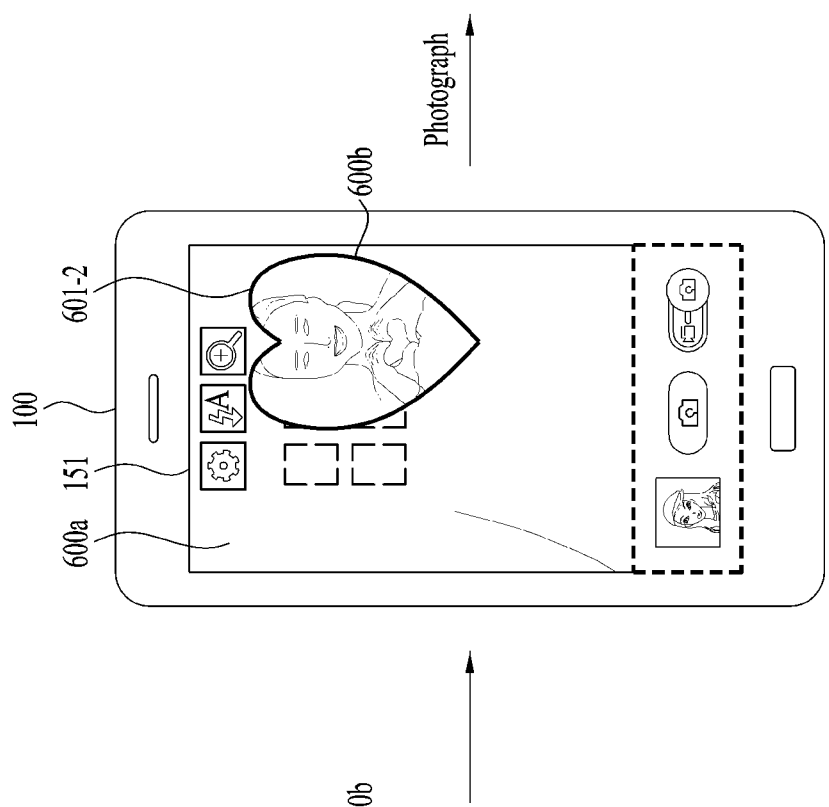

Analyze pose of character →

Rotate & Change shape

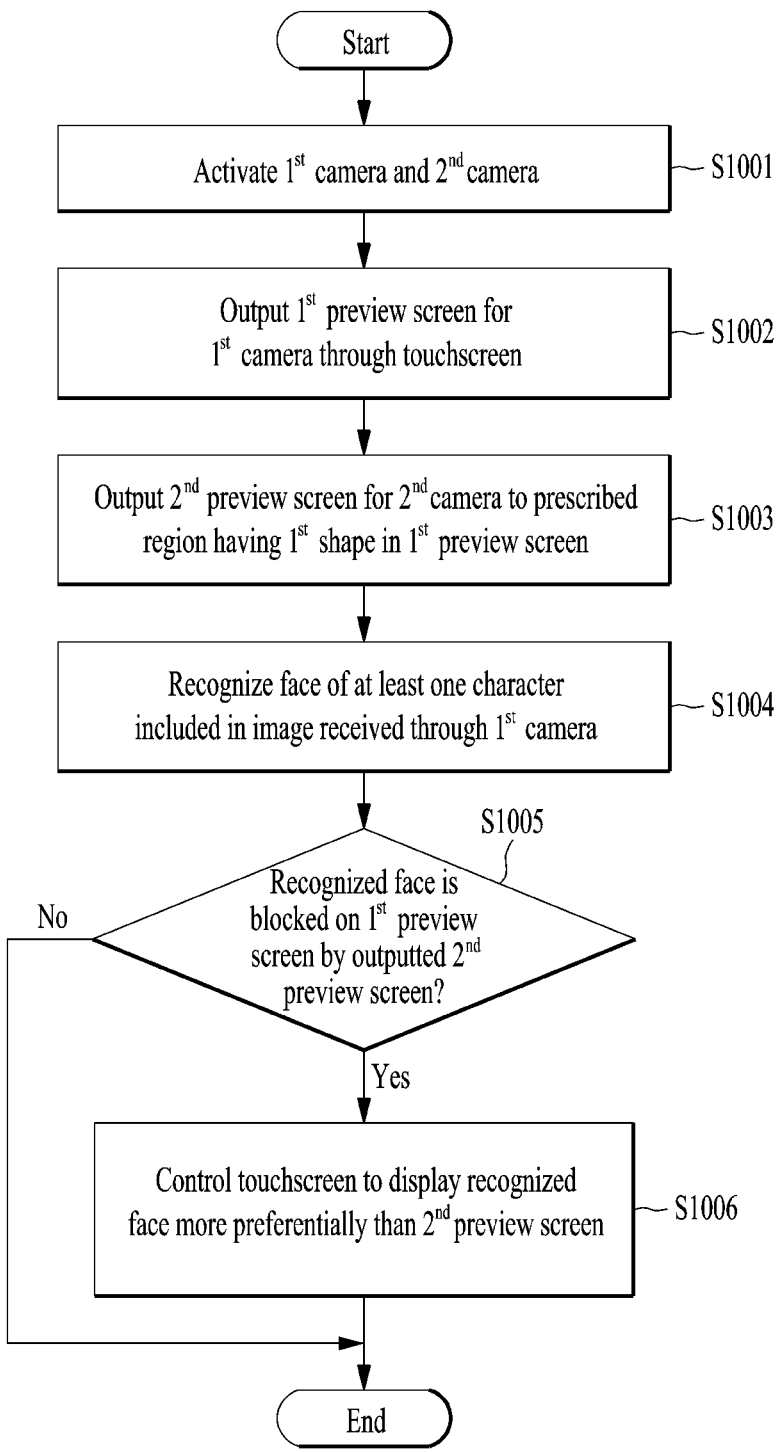

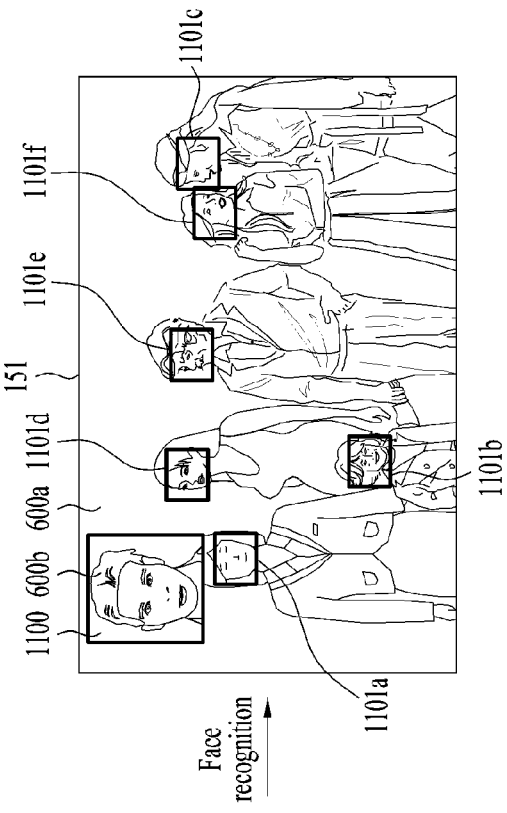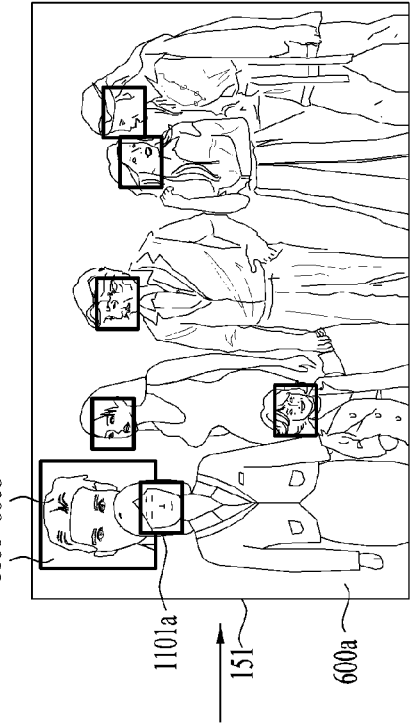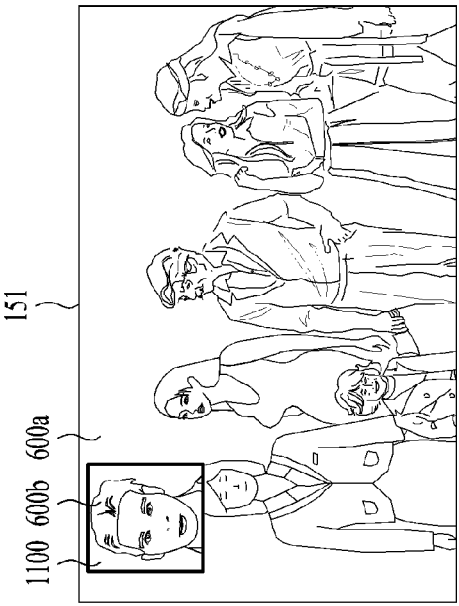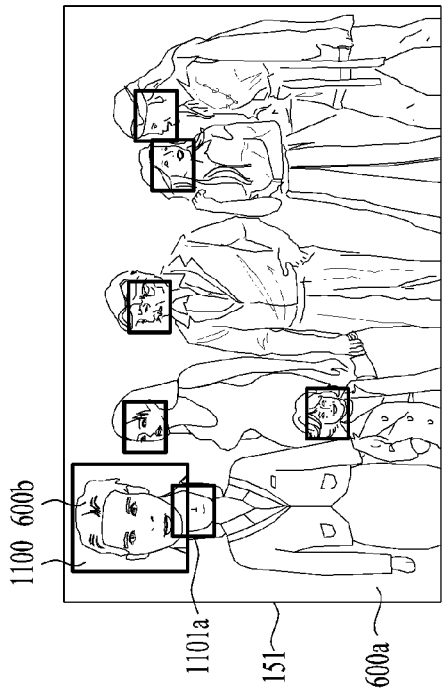

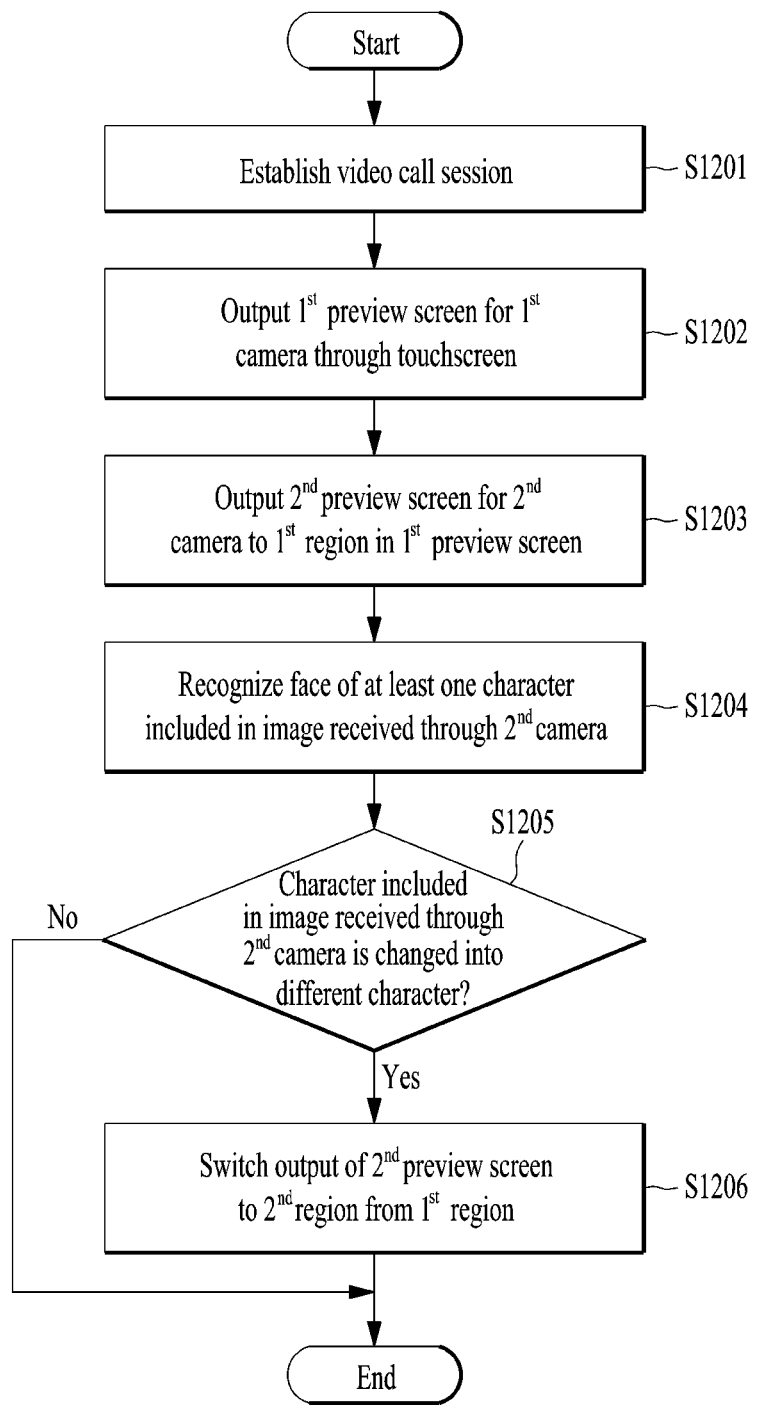

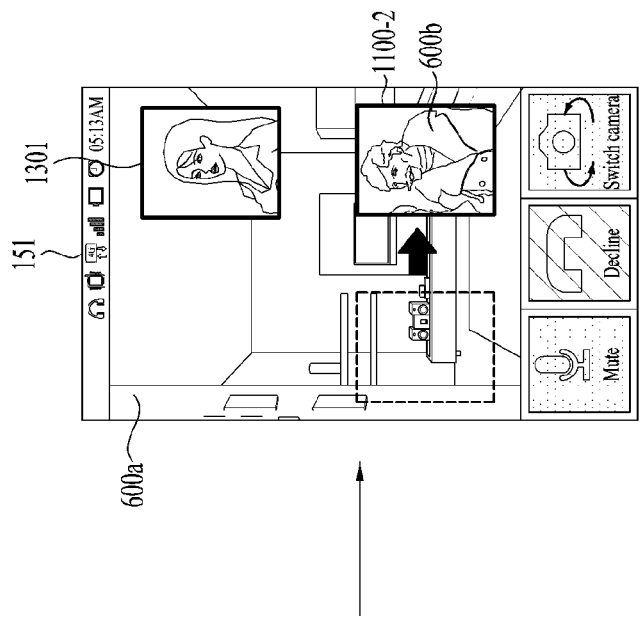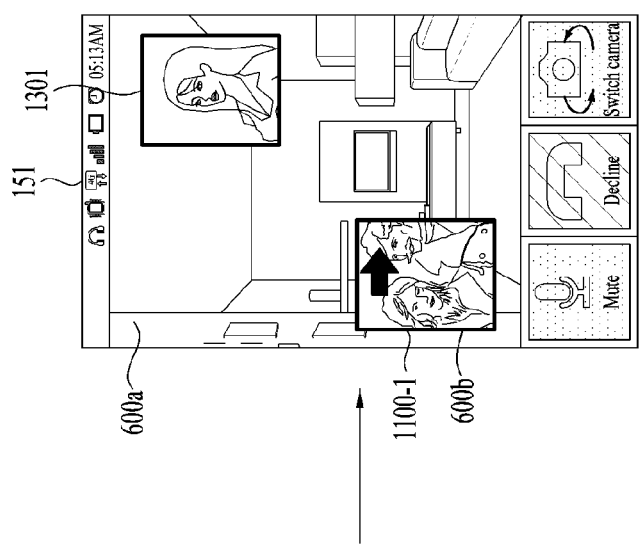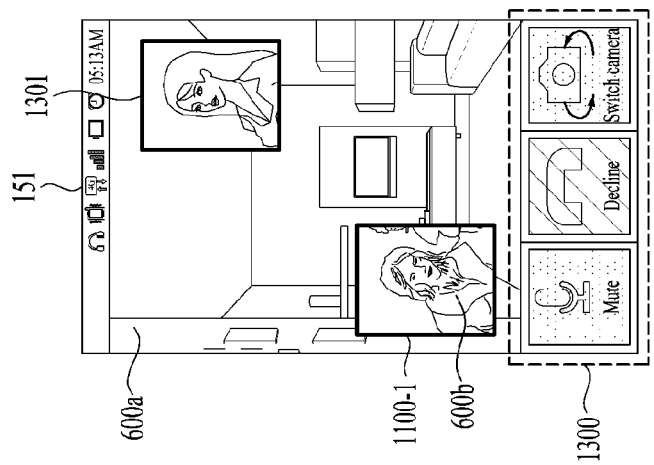

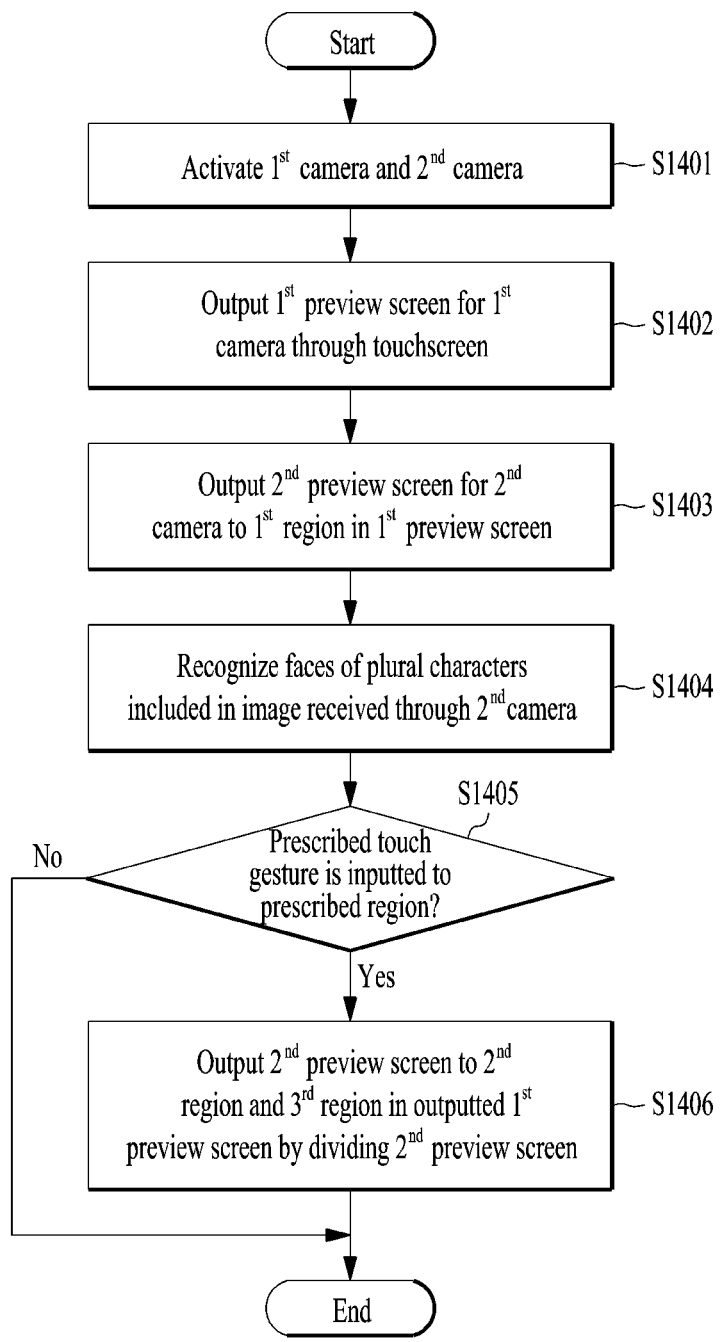

MOBILE TERMINAL AND CONTROLLING METHOD THEREOF

Pursuant to 35 U.S.C. §119(a), this application claims the benefit of earlier filing date and right of priority to Korean Application No. 10-2014-0005966, filed on Jan. 17, 2014, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating the use of a terminal in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

A recently released mobile terminal such as a smartphone, a digital camera and the like intends to enhance user's convenience by being equipped with both a front camera and a rear camera. In this case, the front camera means a camera facing the same direction of a display surface of a display of the mobile terminal. And, the rear camera means a camera facing a direction opposite to that of the front camera. Generally, a preview screen for a front/rear camera is provided through a display. Hence, the front camera may be frequently used to take a photo of a photographer, while the rear camera may be frequently used to take a photo of a subject other than the photographer.

However, an existing mobile terminal is able to utilize each of the front camera and the rear camera separately or is only able to synthesize images taken through the front camera and the rear camera together. Hence, the demands for a controlling method for enhancing an aesthetic effect as well as user's convenience by utilizing the front camera and the rear camera more effectively are increasingly rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a front camera and a rear camera can be effectively utilized.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a first camera, a second camera, a touchscreen, and a controller, if the first and second cameras are activated, outputting a first preview screen for the first camera through the touchscreen, the controller outputting a second preview screen for the second camera to a prescribed region having a first shape in the outputted first preview screen, the controller changing the first shape into a second shape based on an image received through at least one of the first camera and the second camera.

Preferably, the controller may change a shape of the prescribed region into the second shape based on a pose of a character included in the image received through the second camera.

Preferably, the controller may change a shape of the prescribed region based on a type of an image included in the image received through the first camera.

Preferably, the first camera may be arranged in a direction opposite to a direction faced by the touchscreen and the second camera may be arranged in a same direction faced by the touchscreen.

In another aspect of the present invention, as embodied and broadly described herein, a mobile terminal according to the present invention may include a first camera, a second camera, a touchscreen, and a controller, if the first and second cameras are activated, outputting a first preview screen for the first camera through the touchscreen, the controller outputting a second preview screen for the second camera to a prescribed region in the outputted first preview screen, the controller recognizing a face of at least one character included in an image received through the first camera, the controller, if the recognized face is blocked on the first preview screen by the second preview screen, displaying the recognized face of the first preview screen preferentially.

Preferably, the controller may display the second preview screen on the prescribed region more preferentially than the recognized face.

In another aspect of the present invention, as embodied and broadly described herein, a mobile terminal according to the present invention may include a first camera, a second camera, a wireless communication unit configured to perform a video call, a touchscreen, and a controller, if the video call is connected, outputting a first preview screen for the first camera through the touchscreen, the controller outputting a second preview screen for the second camera to a first region in the outputted first preview screen, the controller, if a character included in an image received through the second camera is changed into a different character, switching an output of the second preview screen to a second region from the first region.

In another aspect of the present invention, as embodied and broadly described herein, a mobile terminal according to the present invention may include a first camera, a second camera, a touchscreen, and a controller, if the first and second cameras are activated, outputting a first preview screen for the first camera through the touchscreen, the controller outputting a second preview screen for the second camera to a first region in the outputted first preview screen, the controller, if receiving a touch input to the first region, controlling the second preview screen for the second camera to be outputted to a second region and a third region in the first preview screen in a manner of being divided.

Preferably, the controller may control a first face and a second face recognized from an image received through the second camera to be separately outputted to the second region and the third region, respectively.

In another aspect of the present invention, as embodied and broadly described herein, a method of controlling a mobile terminal according to the present invention may include the steps of if first and second cameras included in the mobile terminal are activated, outputting a first preview screen for the first camera through a touchscreen included in the mobile terminal, outputting a second preview screen for the second camera to a prescribed region having a first shape in the outputted first preview screen, and changing the first shape into a second shape based on an image received through at least one of the first camera and the second camera.

Preferably, the method may further include the step of changing a shape of the prescribed region into the second shape based on a pose of a character included in the image received through the second camera.

More preferably, the method may further include the step of changing a shape of the prescribed region based on a type of an image included in the image received through the first camera.

Preferably, the first camera may be arranged in a direction opposite to a direction faced by the touchscreen and the second camera may be arranged in a same direction faced by the touchscreen.

In another aspect of the present invention, as embodied and broadly described herein, a method of controlling a mobile terminal according to the present invention may include the steps of if first and second cameras included in the mobile terminal are activated, outputting a first preview screen for the first camera through a touchscreen included in the mobile terminal, outputting a second preview screen for the second camera to a prescribed region in the outputted first preview screen, and recognizing a face of at least one character included in an image received through the first camera, wherein in the second preview screen outputting step, if the recognized face is blocked on the first preview screen by the second preview screen, the recognized face of the first preview screen is preferentially displayed.

Preferably, in the second preview screen outputting step, the second preview screen may be displayed on the prescribed region more preferentially than the recognized face.

In another aspect of the present invention, as embodied and broadly described herein, a method of controlling a mobile terminal according to the present invention may include the steps of if a video call with a counterpart is connected through a wireless communication unit, outputting a first preview screen for a first camera included in the mobile terminal through a touchscreen included in the mobile terminal, outputting a second preview screen for a second camera included in the mobile terminal to a first region in the outputted first preview screen, and if a character included in an image received through the second camera is changed into a different character, switching an output of the second preview screen to a second region from the first region.

In another aspect of the present invention, as embodied and broadly described herein, a method of controlling a mobile terminal according to the present invention may include the steps of if first and second cameras included in the mobile terminal are activated, outputting a first preview screen for the first camera through a touchscreen included in the mobile terminal, outputting a second preview screen for the second camera to a first region in the outputted first preview screen, if receiving a touch input to the first region, outputting the second preview screen for the second camera to a second region and a third region in the first preview screen in a manner of dividing the second preview screen.

Preferably, in the second preview screen outputting step, a first face and a second face recognized from an image received through the second camera may be separately outputted to the second region and the third region, respectively.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 5 is a flowchart of a controlling method for photographing an emotional image by utilizing both a front camera and a rear camera together according to one embodiment of the present invention.

FIG. 6A, FIG. 6B, FIG. 6C, FIG. 7A and FIG. 7B are diagrams of configurations for a controlling method for photographing an emotional image by utilizing both a front camera and a rear camera together according to first and second embodiments of the present invention, respectively.

FIG. 10 is a flowchart for a controlling method of determining output priorities of first and second preview screens for first and second cameras respectively according to one embodiment of the present invention.

FIG. 11A, FIG. 11B, FIG. 11C and FIG. 11D are diagrams for a controlling method of determining output priorities of first and second preview screens for first and second cameras respectively according to one embodiment of the present invention.

FIG. 12 is a flowchart for a controlling method of changing a region for displaying a preview screen for a second camera in response to a change of a character included in an image received through the second camera according to one embodiment of the present invention.

FIG. 13A, FIG. 13B and FIG. 13C are diagrams for a controlling method of changing a region for displaying a preview screen for a second camera in response to a change of a character included in an image received through the second camera according to one embodiment of the present invention.

FIG. 14 is a flowchart for a controlling method of displaying a plurality of characters existing on a second preview screen by partitioning the second preview screen into a plurality of regions according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
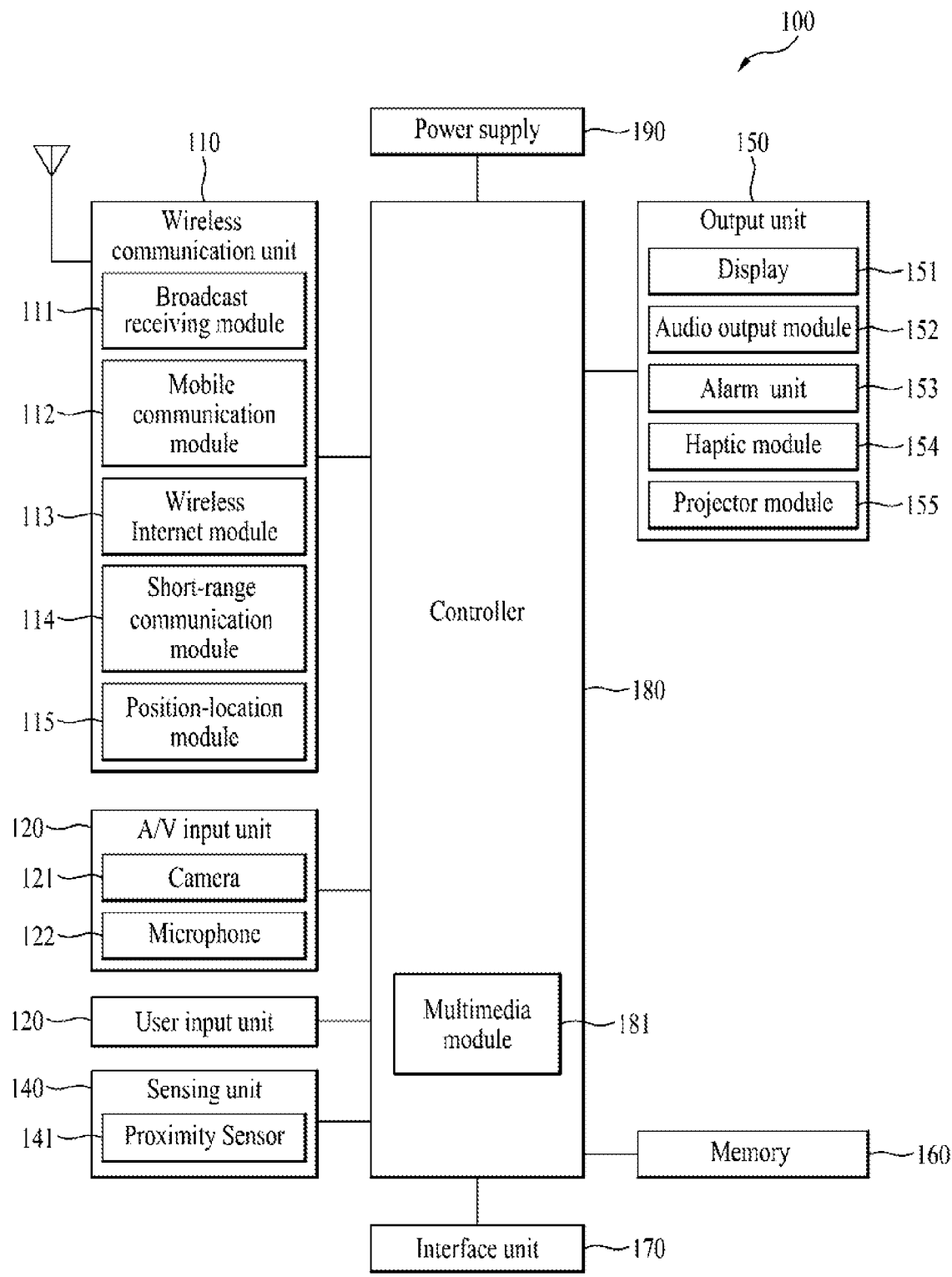
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LA/V) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
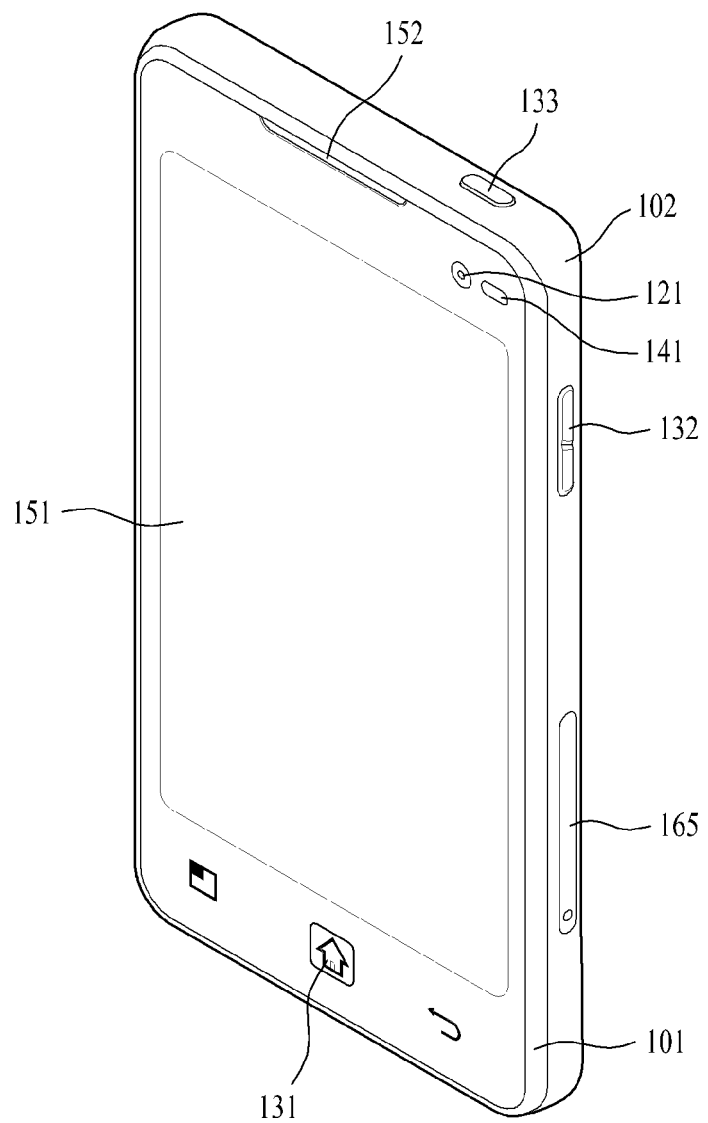
FIG. 2 is a front perspective diagram for one example of a mobile or portable terminal according to the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 3:
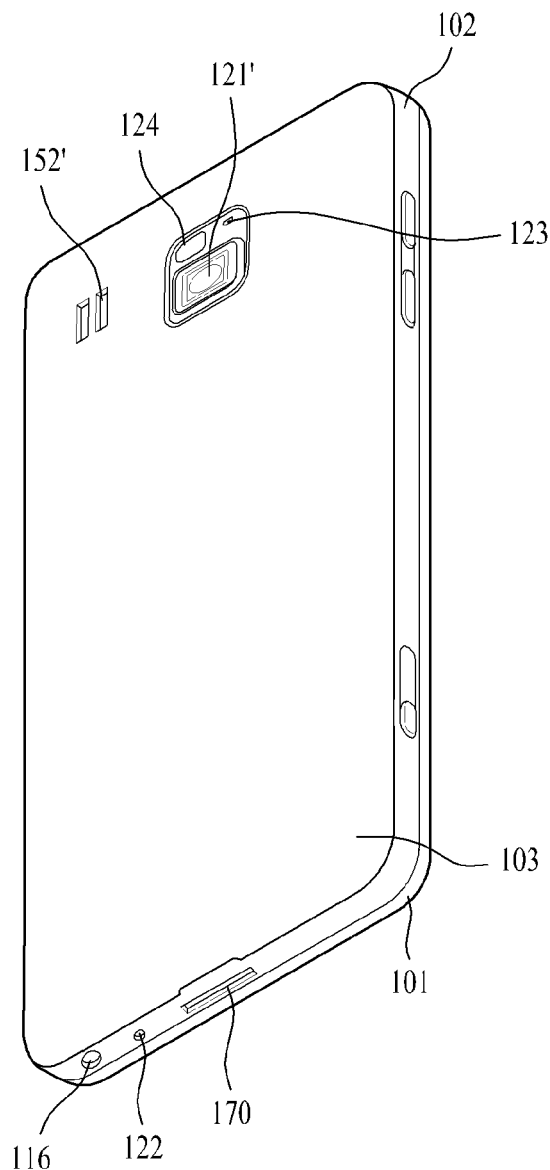
FIG. 3 is a rear perspective diagram of the mobile terminal shown in FIG. 2.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 4:
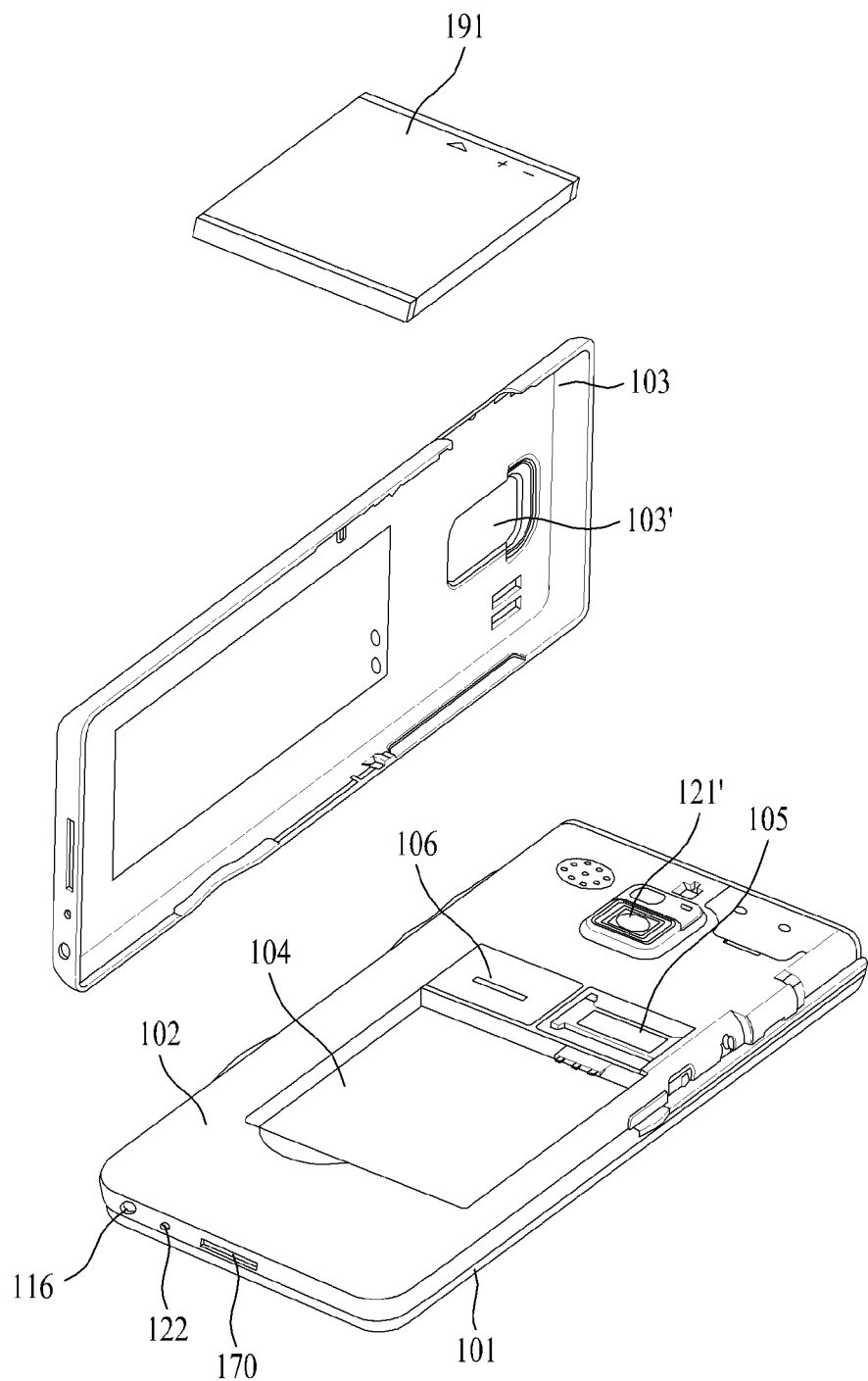
FIG. 4 is a rear perspective diagram of a surface of a rear case exposed by separating a rear cover of a mobile terminal according to one embodiment of the present invention.

FIG. 4 is a rear perspective diagram of a surface of a rear case exposed by separating a rear cover of a mobile terminal according to one embodiment of the present invention.

Referring to FIG. 4, a front case 101, a rear case 102, a rear cover (or a battery cover) 103, a camera 121', an interface unit 170, a microphone 122, a speaker module 154, an audio output unit 152', a battery 191, a battery loading unit 104, a USIM card loading unit 166, and a memory card loading unit 167 are provided.

A space for mounting such an external part as the battery loading unit 104, the USIM card loading unit 105, the memory card loading unit 106 and the like can be provided to a surface of the rear case 102. Generally, the external part loaded on the surface of the rear case 102 is provided to extend functions of the mobile terminal 100 in order to meet the diversified functions of the mobile terminal and a variety of the consumer's needs.

As the performance of the mobile terminal gets diverse, the battery 191 can be configured as a replaceable type, as shown in FIG. 4, to complement a considerable amount of power consumption. In case that the replaceable type is adopted, the battery loading unit 104 is formed on the surface of the rear case 102 to enable a user to detach the corresponding battery. In this case, a contact terminal is provided to the battery loading unit 104 to be electrically connected to a part installed within the case.

The USIM card loading unit 166 or the memory card loading unit 167 may be provided, as shown in FIG. 4, next to the battery loading unit 104. Alternatively, the USIM card loading unit 166 or the memory card loading unit 167 may be provided to a bottom surface of the battery loading unit 104. Hence, the battery 191 can be externally exposed if the battery 191 is unloaded from the battery loading unit 104. In this case, since a size of the battery loading unit 104 is extensible, the battery 191 can be oversized.

Although FIG. 4 shows the configuration that the USIM card loading unit 166 or the memory card loading unit 167 is mounted on a backside of the rear case 102, it can be inserted in or separated from the mobile terminal 100 in a manner of being inserted in a lateral side of the rear case 102.

The rear cover 103 covers the surface of the rear case 102. Hence, the rear cover 103 can fix the battery, 191, the USIM card, the memory card and the lime not to be separated from the rear case 102 and also protects the external parts from external shocks or particles. Recently, a waterproof function is added to the mobile terminal 100. In order to prevent the external parts from contacting with water, the mobile terminal 100 can further include a waterproof structure. Hence, when rear case 102 and the rear cover 103 are connected to each other, the waterproof structure can seal up the gap between the rear case 102 and the rear cover 103.

FIG. 5 is a flowchart of a controlling method for photographing an emotional image by utilizing both a front camera and a rear camera together according to one embodiment of the present invention. FIG. 6A, FIG. 6B, FIG. 6C, FIG. 7A and FIG. 7B are diagrams of configurations for a controlling method for photographing an emotional image by utilizing both a front camera and a rear camera together according to first and second embodiments of the present invention, respectively. Such a controlling method is described in detail with reference to FIGS. 5 to 7B as follows.

Referring to FIGS. 5 to 7B, in a step S501, the controller 180 can activate a first camera (e.g., the front camera 121) and a second camera (e.g., the rear camera 121'). In a step S502, the controller 180 can output a first preview screen 600a for the first camera through the touchscreen 151 [FIG. 6A, FIG. 7A]. According to the examples shown in FIG. 6A through and FIG. 7B, the first camera includes the rear camera 121'.

Figure 7A:
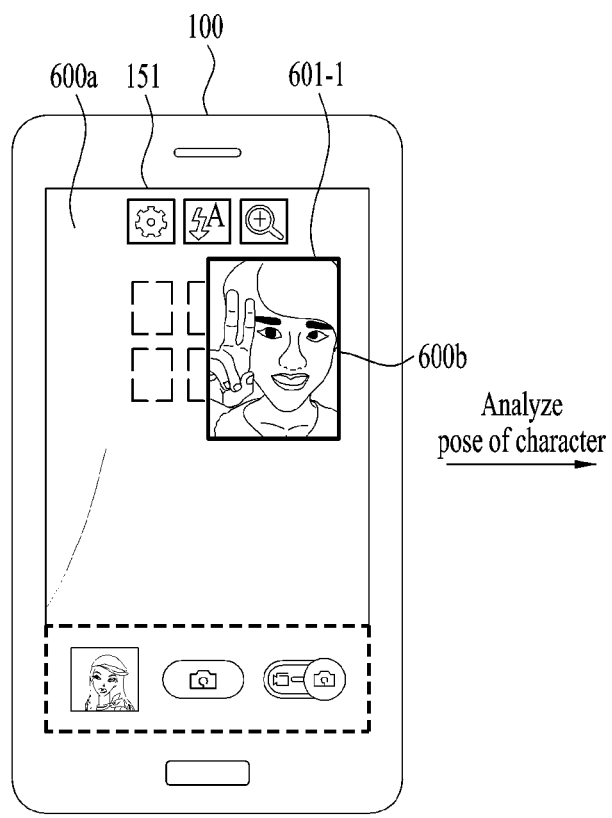

In a step S503, the controller 180 outputs a second preview screen 600b for the second camera to a prescribed region, which has a first shape 601-1, of the first preview screen 600a [FIG. 6A, FIG. 7A]. In this case, the first shape 601-1 may include a shape selected by a user or a preset shape on a system. According to the examples shown in FIG. 6A through FIG. 7B, the first shape 601-1 includes a rectangular shape shown in FIG. 6A or FIG. 7A. According to the examples shown in FIG. 6A through FIG. 7B, the second camera includes the front camera 121.

According to one embodiment of the present invention, it is proposed to analyze a pose of a character included in an image received through the second camera and to change a shape of a region for outputting the second preview screen 600b using a result of the analysis. Hence, in a step S504, the controller 180 preferentially determines whether a character is included in the image received through the second camera. If the controller 180 determines that a character is not included in the image received through the second camera, the controller 180 can go to a step S507. If the controller 180 determines that a character is included in the image received through the second camera, the controller 180 can go to a step S505. In the step S505, the controller 180 analyzes a pose of the character included in the image received through the second camera. According to one embodiment of the present invention, the pose may include a hand action of the character as well as a pose of a full body of the character.

According to the example shown in FIG. 6A through FIG. 6C, the second preview screen 600b for the front camera 121, which is the second camera, is currently outputted. In doing so, the second preview screen 600b includes a figure of a photographer. As a result of an analysis of a pose of the photographer, the controller 180 may determine that the photographer does a hand action of forming a heart using hands. If so, the controller 180 can change a shape of the prescribed region having the first shape 600-1 into a second shape 601-2 as a result of the analysis of the photographer's pose (S506). And, the controller 180 may be able to output the second preview screen 600b through the prescribed region of which shape has been changed into the second shape 601-2.

In the step S507, if a photographing command is received from a user, the controller 180 synthesizes a first image received through the first camera with a second image received through the second camera and then saves the synthesized image 604. FIG. 6C is a diagram of the synthesized and saved image 604. In particular, the saved image 604 can be saved to correspond to the first and second preview screens 600a and 600b shown in FIG. 6B. In more particular, a shape of the region for outputting the second preview screen 600b may include the identically synthesized image 604 as well. Hence, in synthesizing the second image on the first image, the controller 180 may be able to synthesize the second image to correspond to the outputted first and second preview screens 600a and 600b.

According to one embodiment of the present invention mentioned in the following description, a saved image can be saved in a manner of being synthesized to correspond to the first and second preview screens displayed through the touchscreen 151 as well.

Figure 7B:
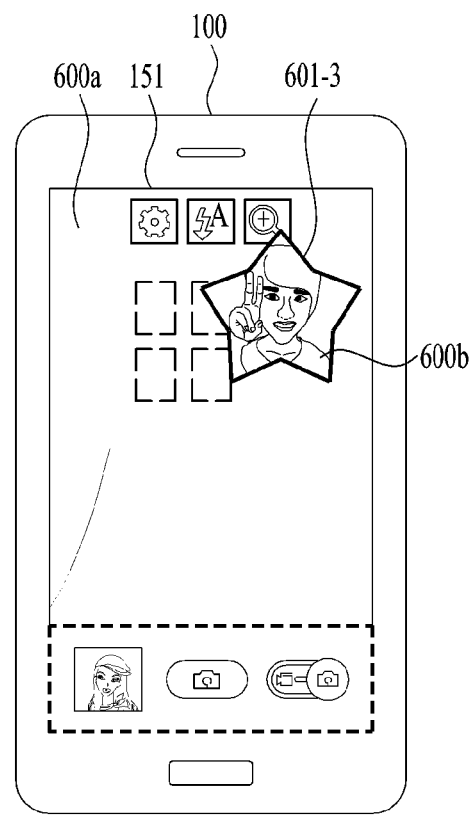

According to the example shown in FIG. 6A through FIG. 6C, a second shape 601-2 of the prescribed region for displaying the second preview screen 600b changed on the basis of the hand action of the photographer is 'heart shape'. Yet, FIG. 7A and FIG. 7B shows one example of a shape different from the former shape shown in FIG. 6A through FIG. 6C.

Referring to FIG. 7A, a second preview screen 600b is currently outputted through a prescribed region having a first shape 601-1. And, the first shape 601-1 is a rectangular shape for example. A photographer's hand action on an image received through the front camera 121, which is the second camera, has a shape of 'V'. As a result from analyzing a pose of the photographer, the controller 180 can change a shape of the prescribed region for outputting the second preview screen 600b into a third shape 601-3. Referring to FIG. 7B, the third shape 601-3 is 'star shape'.

According to the embodiment described with reference to FIGS. 5 to 7, it is proposed to change a shape of a prescribed region for outputting the second preview screen 600b by analyzing a photographer's pose. According to another embodiment of the present invention, it is proposed to determine whether a landscape exists in an image and to change a shape of a prescribed region for outputting the second preview screen 600b based on a result of the determination. Such an embodiment is described in detail with reference to FIG. 8A and FIG. 8B as follows.

Figure 8A:
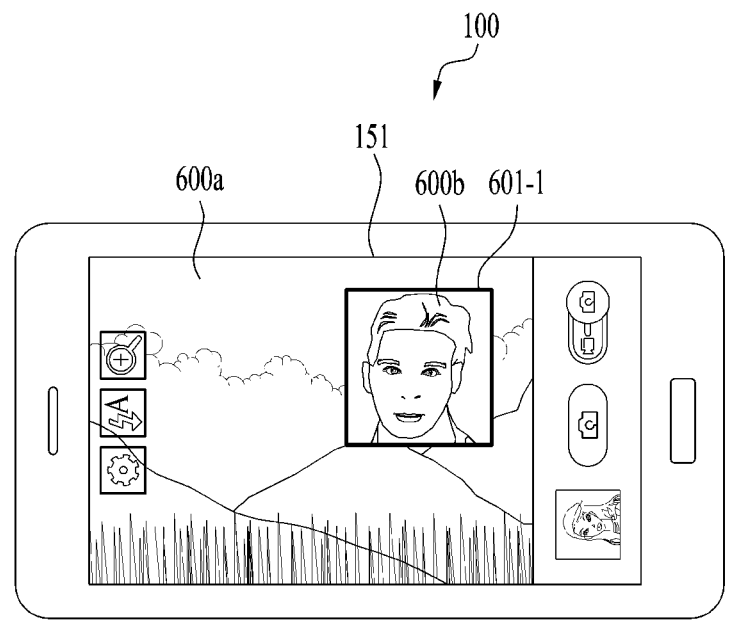
FIG. 8A and FIG. 8B are diagrams for a controlling method of changing a shape of a prescribed region to output a second preview screen 600*b* depending on a type of an image according to one embodiment of the present invention. In this case, the type of the image may mean at least one classification such as a landscape photo, a portrait photo, a building photo, a close-up photo, a baby photo, a model photo, an athletic photo, a climbing photo, a bicycle photo and the like, by which the type of the image is non-limited. And, the type of the image may inclusively mean the classification attributed to a content of an image.
Figure 8B:
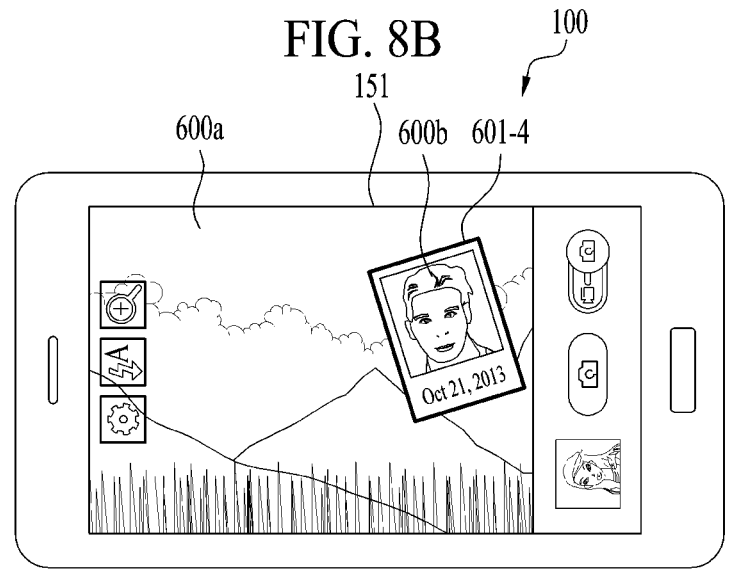

FIG. 8A and FIG. 8B are diagrams for a controlling method of changing a shape of a prescribed region to output the second preview screen 600b depending on a type of an image according to one embodiment of the present invention.

Referring to FIG. 8A, the controller 180 activates the first camera and the second camera and is then able to display a first preview screen 600a and a second preview screen 600b for the activated first camera and the activated second camera, respectively. In doing so, the controller 180 can display the first preview screen 600a on the touchscreen 151 and is also able to display the second preview screen 600b on a prescribed region, which has a first shape 601-1, of the first preview screen 600a.

If it is determined that a landscape is included in an image received through the first camera, referring to FIG. 8B, the controller 180 can change a shape of the prescribed region for displaying the second preview screen 600b into a fourth shape 601-4 from the first shape 601-1. According to the example shown in FIG. 8A and FIG. 8B, the fourth shape 601-4 is a postcard shape and a photographed date of a current image can be further displayed on the postcard shape.

According to the embodiment mentioned in the above description, a controlling method of changing a shape of a prescribed region for displaying the second preview screen 600b is described. According to another e embodiment of the present invention, it is proposed to rotate the second preview screen 600b itself as well as to change a shape.

Figure 9A:
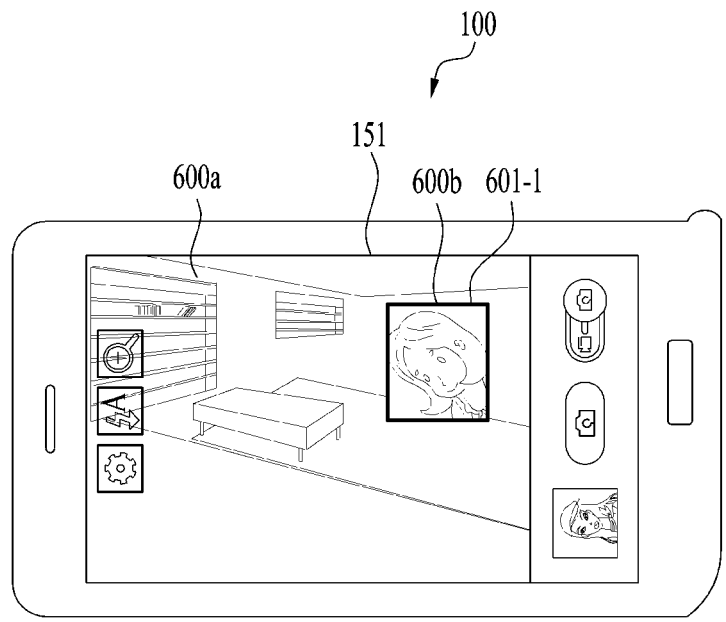
FIG. 9A and FIG. 9B are diagrams for a controlling method of outputting a second preview screen 600*b* by rotating the second preview screen 600*b* itself based on a face recognized from the second preview screen 600*b* according to one embodiment of the present invention.
Figure 9B:
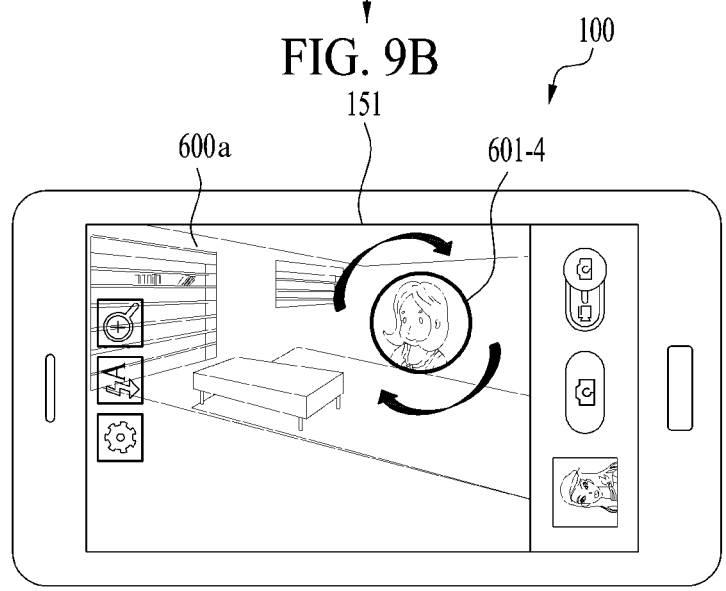

FIG. 9A and FIG. 9B are diagrams for a controlling method of outputting a second preview screen 600b by rotating the second preview screen 600b itself based on a face recognized from the second preview screen 600b according to one embodiment of the present invention.

According to one embodiment of the present invention, the controller 180 can recognize a face of each character included in an image by algorithm capable of analyzing faces on an image. In this case, the algorithm analyzes a shape of an eye, nose, mouth or of a character and/or a relative location of the character in an image and is then able to recognize a face of the character using the analyzed eye. Nose of mouth. In the detailed description of the invention to describe one embodiment of the present invention, a result of the recognition by the algorithm shall be named a face recognition information. In particular, the face recognition information may include a relative location information of a recognized face on a whole region through which an image is currently outputted. In case that a plurality of characters appear in a photo, a face recognition information may include an individual information on each of at least one or more characters. Hence, in case that a plurality of characters are included in an image, a face recognition information of the corresponding image may include a face recognition result of at least one of a plurality of the characters. A face recognition information may be analyzed each time a search operation is performed on an image. Yet, as a face recognition information analyzed once is saved as meta data of a corresponding image, repetitive analysis may not be required.

Referring to FIG. 9A, the controller 180 activates the first camera and the second camera and is then able to display a first preview screen 600a and a second preview screen 600b for the activated first camera and the activated second camera, respectively. In doing so, the controller 180 can display the first preview screen 600a on the touchscreen 151 and is also able to display the second preview screen 600b on a prescribed region, which has a first shape 601-1, of the first preview screen 600a.

The controller 180 identifies a face of a character included in an image received through the second camera and is then able to rotate the second preview screen 600b based on a result of the identified face. In doing so, when a rotated degree (or angle) is determined, the controller 180 may control the identified face to be straightened. If a face is straightened, it may mean a state that both eyes of a identified face stand in parallel with a ground surface (or, one side of the touchscreen 151).

As mentioned in the foregoing description, the controller 180 can perform an operation of changing a shape of the prescribed region for outputting the second preview screen 600b into the fourth shape 601-4 from the first shape 601-1 as well as the above-mentioned rotational operation.

According to the embodiment of the present invention mentioned so far in the above description, the controlling method of rotating and outputting the shape of the prescribed region, through which the second preview screen 600b is outputted, and the second preview screen 600b is explained. In the following description, in case of outputting a first preview screen 600a and a second preview screen 600b, and more particularly, in case of recording a video, a controlling method of setting a priority of a preview screen output is described in detail with reference to FIG. 10 through FIG. 11D.

FIG. 10 is a flowchart for a controlling method of determining output priorities of first and second preview screens for first and second cameras respectively according to one embodiment of the present invention. FIG. 11A, FIG. 11B, FIG. 11C and FIG. 11D are diagrams for a controlling method of determining output priorities of first and second preview screens for first and second cameras respectively according to one embodiment of the present invention. Such a controlling method is described in detail with reference to FIG. 10 through FIG. 11D as follows.

Referring to FIG. 10 through FIG. 11D, in a step S1001, the controller 180 activates the first camera and the second camera. In a step S1002, referring to FIG. 11A, the controller 180 can output a first preview screen 600a for the first camera through the touchscreen 151. In a step S1003, the controller 180 can output a second preview screen 600b through a prescribed region 1100 on the outputted first preview screen 600a.

In a step S1004, the controller 180 can recognize a face of at least one character included in an image received through the first camera. FIG. 11B is a diagram for a configuration of a result of the recognition. According to the example shown in FIG. 11B, the controller 180 recognizes faces of 6 characters. In this case, face indicators 1101a to 1101f indicating the recognition result are displayed at locations of the recognized faces, respectively.

According to the example shown in FIG. 11C, as a photographer changes a direction faced by the camera, assume that a portion of the recognized face is blocked by the output of the second preview screen 600b. In this case, according to one embodiment of the present invention, it is proposed to preferentially display the output of the recognized face. In a step S1005, the controller 180 determines whether the recognized face is blocked by the outputted second preview screen 600b on the first preview screen 600a. As a result of the determination, if the recognized face is blocked as shown in FIG. 11C, the controller 180 goes to a step S1006. Otherwise, the controller 180 ends the controlling method. In the step S1006, referring to FIG. 11D, the controller 180 can control the touchscreen 151 to display the recognized face more preferentially than the second preview screen 600b.

According to another embodiment of the present invention, in utilizing the first camera and the second camera effectively, a controlling method for a case of making a video call is proposed as well. Such an embodiment is described in detail with reference to FIG. 12 through FIG. 13C as follows.

FIG. 12 is a flowchart for a controlling method of changing a region for displaying a preview screen for a second camera in response to a change of a character included in an image received through the second camera according to one embodiment of the present invention. FIG. 13A, FIG. 13B and FIG. 13C are diagrams for a controlling method of changing a region for displaying a preview screen for a second camera in response to a change of a character included in an image received through the second camera according to one embodiment of the present invention. Such a controlling method is described in detail with reference to FIG. 12 through FIG. 13C as follows.

Referring to FIG. 12 through FIG. 13C, in a step S1201, the controller 180 establishes a video call session with a prescribed counterpart. According to one embodiment of the present invention, a video call can be made while both of the first camera and the second camera provided to the mobile terminal 100 are activated. Hence, if the video call session is established, the mobile terminal 100 transmits image data received from the first camera and the second camera to a counterpart mobile terminal through the established session and is also able to receive image data obtained from at least one camera provided to the counterpart terminal through the established session.

In a step S1202, the controller 180 can output a first preview screen 600a for the first camera through the touchscreen 151. In a step S1203, the controller 180 outputs a second preview screen 600b for the second camera through a first region 1100-1 of the first preview screen 600a. According to the example shown in FIG. 13A, the first camera is the rear camera 121' and the second camera is the front camera 121.

Moreover, the controller 180 can output the image data received through the video call session from the counterpart terminal to a third region 1301. Since the video call is in progress, according to the example shown in FIG. 13A through FIG. 13C, a face of a call counterpart is displayed on the third region 1301.

In a step S1204, the controller 180 recognizes a face of at least one character included in an image received through the second camera.

According to one embodiment of the present invention described with reference to FIG. 12 through FIG. 13C, if a participant in the video call is changed, it is intended to provide a controlling method for a guiding a user with such a change intuitively.

In particular, according to one embodiment of the present invention, a face of a character included in an image received through the second camera is recognized. Subsequently, if a character participating in a video call is changed into a different character, the mobile terminal 100 is proposed to guide a user by changing a location at which the second preview screen 600b is outputted. In a step S1205, the controller 180 determines whether the character included in the image received through the second camera is changed into a different character. As a result of the determination, if the character included in the image received through the second camera is changed into the different character, the controller 180 goes to a step S1206. Otherwise, the controller 180 can end the controlling method.

According to the example shown in FIG. 13A through FIG. 13C, the character outputted through the second preview screen 600b shown in FIG. 13A is changed into the different character shown in FIG. 13B.

In the step S1206, the controller 180 can control the touchscreen 151 to switch the output of the second preview screen 600b to a second region 1100-2 from the first region 1100-1. Hence, like the example shown in FIG. 13C, the controller 180 can output the second preview screen 600b to the second region 1100-2 in response to the character change shown in FIG. 13B.

According to one embodiment of the present invention described with reference to FIG. 14 through FIG. 15D, in case that a plurality of characters are outputted through a second preview screen, a controlling method of guiding a user with a fact of the existence of a plurality of the characters intuitively is proposed as follows.

FIG. 14 is a flowchart for a controlling method of displaying a plurality of characters existing on a second preview screen by partitioning the second preview screen into a plurality of regions according to one embodiment of the present invention. FIG. 15A, FIG. 15B, FIG. 15C and FIG. 15D are diagrams for a controlling method of displaying a plurality of characters existing on a second preview screen by partitioning the second preview screen into a plurality of regions according to one embodiment of the present invention. Such a controlling method is described in detail with reference to FIG. 14 through FIG. 15D as follows.

Figure 15A:
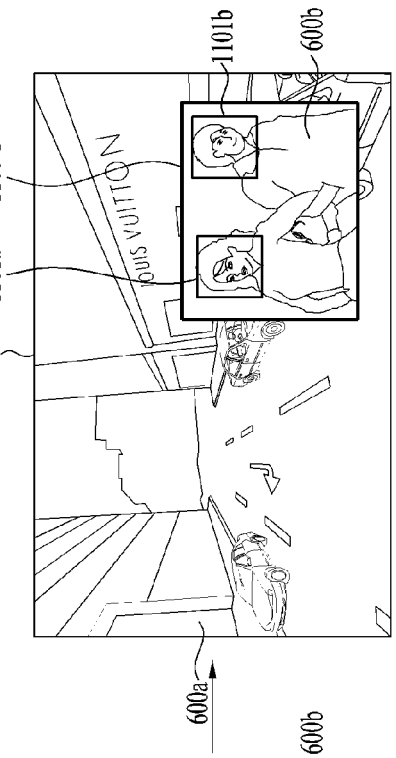
FIG. 15A, FIG. 15B, FIG. 15C and FIG. 15D are diagrams for a controlling method of displaying a plurality of characters existing on a second preview screen by partitioning the second preview screen into a plurality of regions according to one embodiment of the present invention.
Figure 15B:
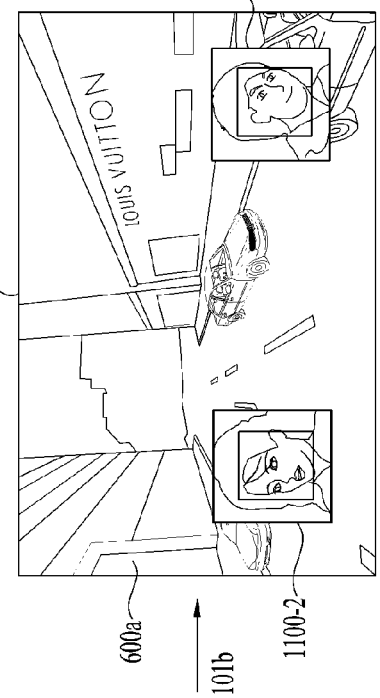
Figure 15C:
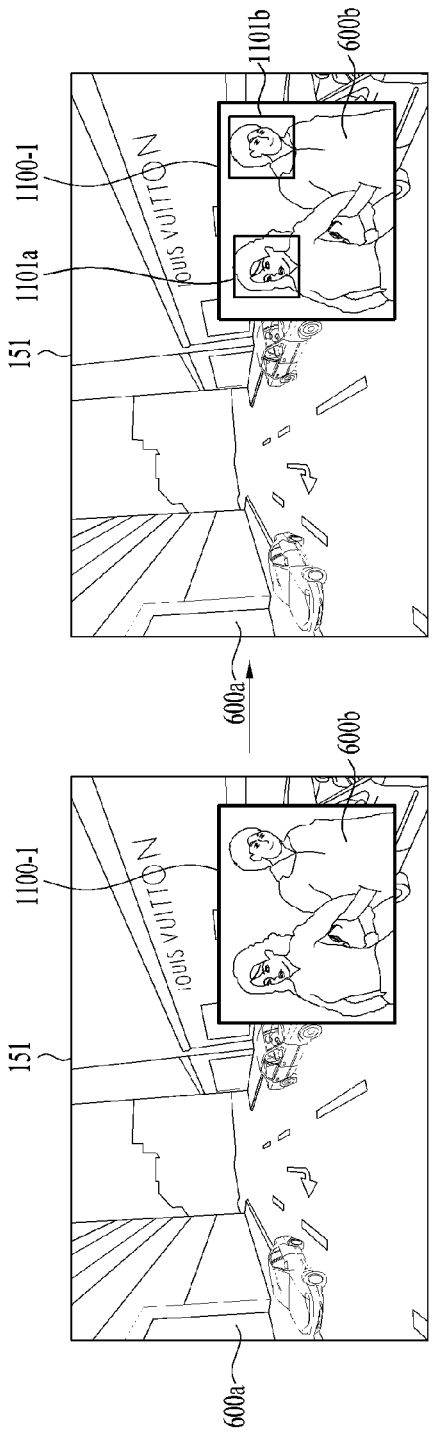
Figure 15D:
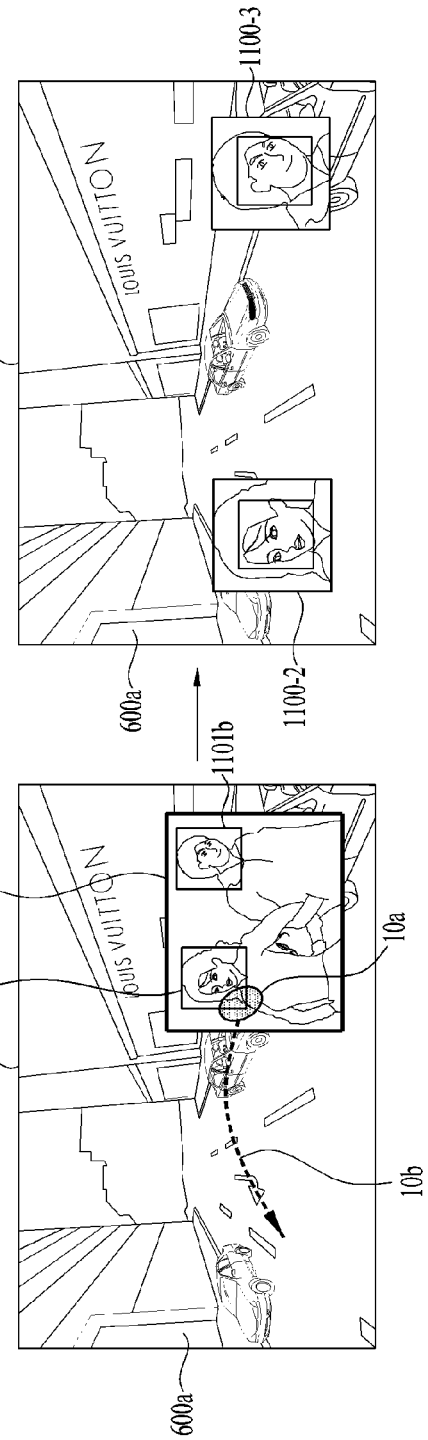

Referring to FIG. 14 through FIG. 15D, in a step S1401, the controller 180 activates the first camera and the second camera. In a step S1402, referring to FIG. 15A, the controller 180 outputs a first preview screen 600a for the first camera through the touchscreen 151. In a step S1403, the controller 180 can output a second preview screen 600b to a prescribed region 1100 on the outputted first preview screen 600a.

In a step S1404, the controller 180 can recognize a face of at least one character included in an image received through the first camera. FIG. 15B is a diagram for a configuration of a result of the recognition. According to the example shown in FIG. 15B, the controller 180 recognizes faces of two characters and controls face indicators 1101a and 1101b indicating the recognition results to be displayed at locations of the recognized faces, respectively.

In a step S1405, the controller 180 determines whether a prescribed touch gesture is inputted to a first region 1101-1. As a result of the determination, if the prescribed touch gesture is inputted, the controller 180 can go to a step S1406. Otherwise, the controller 180 can end the controlling method. In this case, referring to FIG. 15C, the prescribed touch gesture may include an input applied in a manner of inputting a touch 10a to the first region 1101-1 and then performing a drag 10b by maintaining the touch 10a.

In the step S1406, referring to FIG. 15D, the controller 180 can control the second preview screen 600b to be outputted in a following manner. First of all, the controller 180 divides the second preview screen 600b into two parts. Secondly, the controller 180 controls the two parts to be outputted through a second region 1100-2 and a third region 1100-3 of the outputted first preview screen 600a, respectively. In particular, when a plurality of characters are included in the second preview screen 600b, if the second preview screen 600b is divided and outputted, it may mean that a plurality of the characters are separated and outputted through the second region 1100-2 and the third region 1100-3, respectively.

If a photographing command is received, the controller 180 may be able to control a second image, which is received from the second camera, to be saved on a first image received from the first camera to correspond to the first preview screen 600a and the second preview screen 600b.

Meanwhile, according to another embodiment of the present invention, in case that a character included in an image received from the front camera 121 appears or disappears in the course of an image recording, a controlling method of guiding a user with a corresponding timing point in case of playing the image is proposed. Such an embodiment is described in detail with reference to FIG. 16A, FIG. 16B, FIG. 16C, FIG. 16D, FIG. 17A, FIG. 17B, FIG. 17C and FIG. 17D as follows.

FIG. 16A, FIG. 16B, FIG. 16C and FIG. 16D are diagrams for a controlling method of guiding a user in case of appearance or disappearance of a character included in an image received from the front camera 121 in the course of recording a video according to one embodiment of the present invention.

Figure 16A:
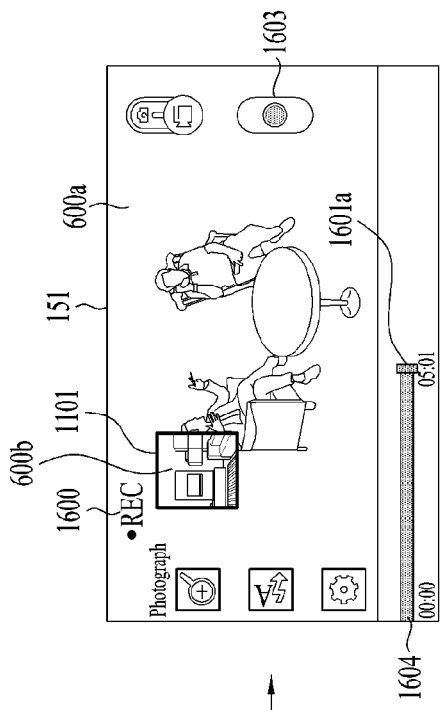
FIG. 16A, FIG. 16B, FIG. 16C and FIG. 16D are diagrams for a controlling method of guiding a user in case of appearance or disappearance of a character included in an image received from a second camera in the course of recording a video according to one embodiment of the present invention.
Figure 16B:
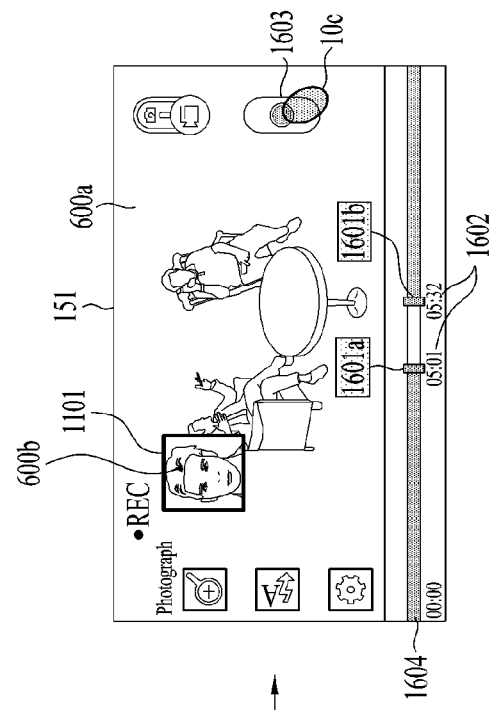

Referring to FIG. 16A, FIG. 16B, FIG. 16C and FIG. 16D, the controller 180 activates the first camera and the second camera, performs a recording, and may output a recording indicator 1600 which indicates a recording is in progress. Referring to FIG. 16A, the controller 180 outputs a first preview screen 600a for the first camera through the touchscreen 151 and also outputs a second preview screen 600b through a prescribed region 1100 on the outputted first preview screen 600a. As the recording proceeds, the controller 180 may be able to further output a recording progressive bar 1604 indicating a progress extent of the recording.

According to the example shown in FIG. 16A, a face figure of a photographer appears on the second preview screen 600b and the second camera includes the front camera 121. The controller 180 recognizes a face of the photographer included in an image received through the front camera 121. While the recording continues to proceed, assume that a figure of the photographer disappears from the second preview screen 600b [FIG. 16B]. In this case, according to one embodiment of the present invention, an information on a timing point, at which the figure of the photographer has disappeared, is saved. Moreover, the controller 180 can control a first timing point indicator 1601a, which is provided to indicate the saved timing point information, to be displayed on the outputted recording progressive bar 1604.

Figure 16C:
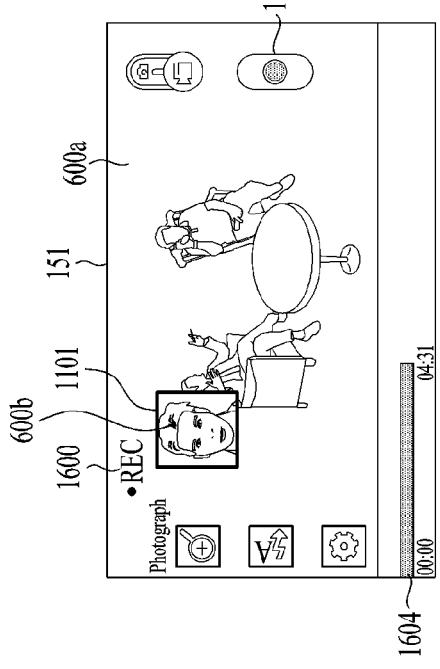

Referring to FIG. 16C the figure of the photographer reappears. The controller 180 also saves an information on a timing point at which the figure of the photographer has reappeared. Likewise, referring to FIG. 16C, the controller 180 can display a second timing point indicator 1601b, which is provided to indicate the saved timing point information, on the outputted recording progressive bar 1604.

According to one embodiment of the present invention, an interval, in which no character is detected from the image received through the second camera, can be displayed on the recording progressive bar 1604 in a manner of being identifiable from other intervals. For instance, since an interval between the first timing point indicator 1601a and the second timing point indicator 1601b displayed on the recording progressive bar 1604 is an interval in which the figure of the photographer disappears, the corresponding interval is represented in a first color. And, the rest of the intervals on the recording progressive bar 1604 can be represented in a second color.

Figure 16D:
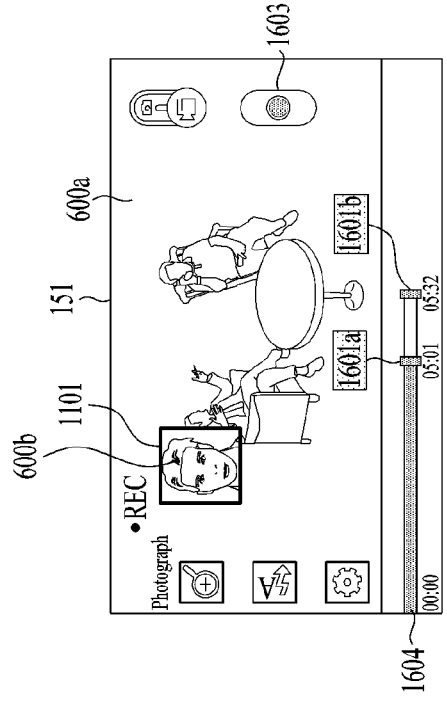

Referring to FIG. 16D, if a recording end command is received, the controller 180 ends the recording and is able to save the recorded video. In this case, the recording end command may include an input of applying a touch 10c to a recording button 1603. A controlling method of playing the saved video in the example shown in FIG. 16A through FIG. 16D is described in detail with reference to FIG. 17A through FIG. 17D as follows.

FIG. 17A, FIG. 17B, FIG. 17C and FIG. 17D are diagrams for a controlling method of playing a video recorded using both a first camera and a second camera according to one embodiment of the present invention.

FIGS. 17A to 17D are diagrams for configurations in playing the saved video shown in FIG. 16A through FIG. 16D. According to the configurations shown in FIGS. 17A to 17D, the mobile terminal 100 currently outputs a play progressive bar 1704 indicating a progress extent of a play. And, the mobile terminal 100 outputs a play point indicator 1703 indicating a current play progressive position to the play progressive bar 1704. Moreover, the mobile terminal 100 outputs a first play screen 1700a for an image received through the first camera and a second play screen 1700b for an image received through the second camera.

According to one embodiment of the present invention, on the play progressive bar 1704, first and second appearing intervals 1701a and 1701b in which a figure of a photographer appears can be displayed in a manner of being identifiable from a non-appearing interval 1702 in which the figure of the photographer does not appear.

According to one embodiment of the present invention described with reference to FIG. 17A through FIG. 17D, when a non-appearing interval on an image recorded through the front camera 121 is played, it is proposed not to display the image through the front camera 121. If a figure of a photographer does not appear, it is not necessary to play a video of the front camera 121.

Figure 17A:
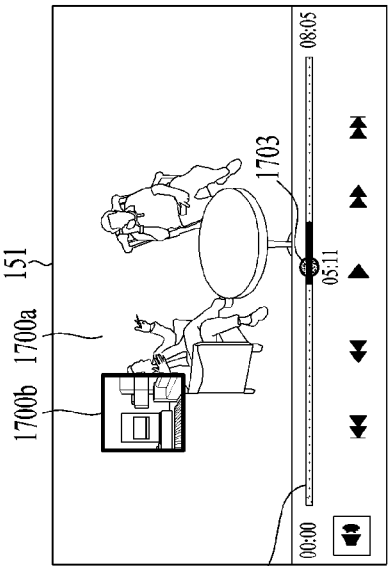
FIG. 17A, FIG. 17B, FIG. 17C and FIG. 17D are diagrams for a controlling method of playing a video recorded using both a first camera and a second camera according to one embodiment of the present invention.
Figure 17B:
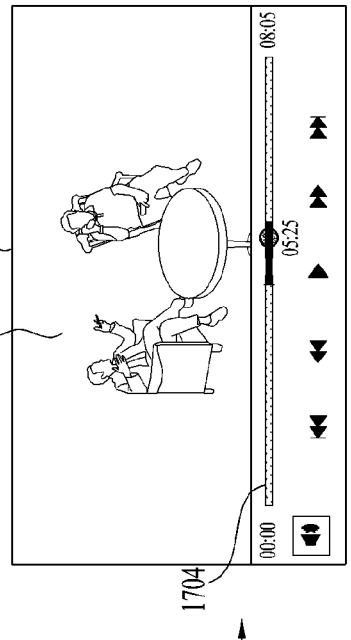
Figure 17C:
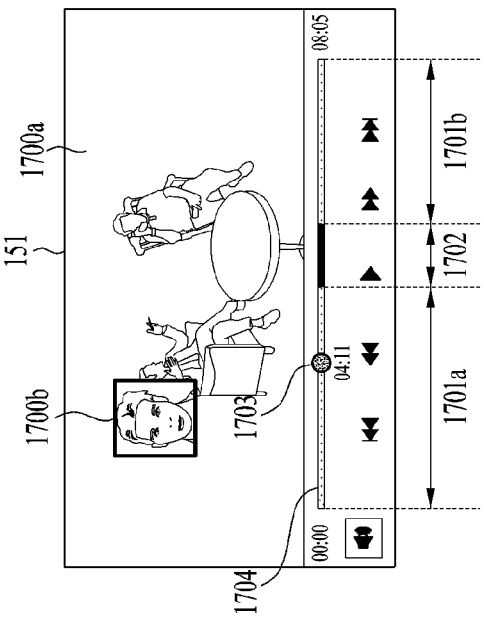

Referring to FIG. 17B, the play timing point indicator 1703 currently passes through the interval 1702 on the play progressive bar 1704. And, it is able to confirm that the figure of the photographer has disappeared from the second play screen 1700b.

If a prescribed touch gesture is received, the controller 180 can control the touchscreen 151 not to output the image received from the front camera 121 in the non-appearing interval on playing the video. For example, the touch gesture may include an input of a touch 10d to the non-appearing interval 1702 on the play progressive bar 1704.

Figure 17D:
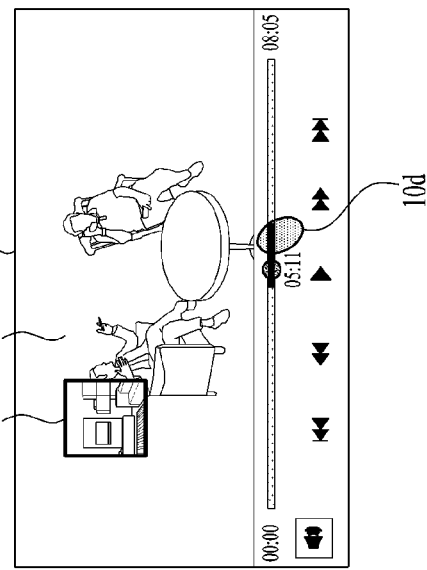

FIG. 17D is a diagram for a play configuration in controlling the image received from the front camera 121 not to be outputted in response to the touch gesture. As the play proceeds, if the play point indicator 1703 passes through the non-appearing interval 1702 and then enters the second appearing interval 1701b, the controller 180 may control the second play screen 1700b for the front camera 121 to be outputted again.

Accordingly, embodiments of the present invention provide various effects and/or features.

According to at least one of embodiments of the present invention, an image received from a front camera can be easily synthesized with an image received from a rear camera.

It will be apparent to those skilled in the art that the present invention can be specified into other form(s) without departing from the spirit or scope of the inventions.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a first camera configured to capture a first image;
a second camera configured to capture a second image;
a touchscreen; and
a controller operably coupled with the first camera, the second camera, and the touchscreen to control the first camera, the second camera, and the touchscreen, and configured to cause the touchscreen to:
display a first preview screen including the captured first image;
display a second preview screen including the captured second image, the displayed second preview screen having a first preset shape and located within the first preview screen; and
change a shape of the second preview screen from the first preset shape to a second preset shape according to a first pose or gesture of a person included in the second image.

2. The mobile terminal of claim 1, wherein:
the first camera and the touchscreen are arranged to face opposite directions; and
the second camera and the touchscreen are arranged to face a same direction.

3. The mobile terminal of claim 1, wherein the controller is further configured to cause the touchscreen to change the shape of the second preview screen from the first preset shape to a third preset shape according to a second pose or gesture of the person included in the second image.

4. The mobile terminal of claim 3, wherein the second preset shape is mapped to the first pose or gesture and the third preset shape is mapped to the second pose or gesture.

5. A mobile terminal comprising:
a first camera configured to capture a first image;
a second camera configured to capture a second image;
a touchscreen; and
a controller operably coupled with the first camera, the second camera, and the touchscreen, and configured to:
control the first camera, the second camera, and the touchscreen;
cause the touchscreen to display a first preview screen including the captured first image;
cause the touchscreen to display a second preview screen including the captured second image, the displayed second preview screen located within the first preview screen;
recognize a face of at least one person included in the first image; and
cause the touchscreen to display the recognized face in the first preview screen over the second preview screen when the recognized face at least partially overlaps with the displayed second preview screen such that at least a portion of the second preview screen is blocked by the recognized face.

6. A mobile terminal comprising:
a first camera configured to capture a first image;
a second camera configured to capture a second image;
a touchscreen; and
a controller operably coupled with the first camera, the second camera, and the touchscreen to control the first camera, the second camera, and the touchscreen, and configured to cause the touchscreen to:
display a first preview screen including the first image when a video call is performed at the mobile terminal;
display a second preview screen including the second image at a first region of the first preview screen; and
move the second preview screen from the first region to a second region of the first preview screen when the second image is changed such that a second person is included in the changed second image instead of a first person that was included in the second image.

7. A mobile terminal comprising:
a first camera configured to capture a first image;
a second camera configured to capture a second image;
a touchscreen; and
a controller operably coupled with the first camera, the second camera, and the touchscreen to control the first camera, the second camera, and the touchscreen, and configured to cause the touchscreen to:
display a first preview screen including the captured first image;
display a second preview screen including the captured second image at a first region of the first preview screen, the second image including more than one object; and divide the second preview screen into a first screen and a second screen in response to receiving a touch input via the displayed second preview screen such that the first screen including a first object is displayed at a second region of the first preview screen and the second screen including a second object is displayed at a third region of the first preview screen.

8. The mobile terminal of claim 7, wherein:
the first object corresponds to a first person and the second object corresponds to a second person; and
the controller is further configured to:
recognize a first face and a second face in the second image, wherein the touch input comprises touching the first face or the second face;
cause the touchscreen to display the recognized first face in the first screen; and
cause the touchscreen to display the recognized second face in the second screen.

9. A method of controlling a mobile terminal comprising a first camera for capturing a first image and a second camera for capturing a second image, the method comprising:
displaying, on a touchscreen, a first preview screen including the captured first image;
displaying, on the touchscreen, a second preview screen including the captured second image, the displayed second preview screen having a first preset shape and located within the first preview screen; and
changing a shape of the second preview screen from the first preset shape to a second preset shape according to a specific pose or gesture of a person included in the second image.

10. The method of claim 9, wherein:
the first camera and the touchscreen are arranged to face opposite directions; and
the second camera and the touchscreen are arranged to face a same direction.

11. A method of controlling a mobile terminal comprising a first camera for capturing a first image and a second camera for capturing a second image, the method comprising:
displaying, on a touchscreen, a first preview screen including the captured first image;
displaying, on the touchscreen, a second preview screen including the captured second image, the second preview screen located within the first preview screen;
recognizing a face of at least one person included in the first image; and
displaying the recognized face in the first preview screen over the second preview screen when the recognized face at least partially overlaps with the displayed second preview screen such that at least a portion of the second preview screen is blocked by the recognized face.

12. A method of controlling a mobile terminal comprising a first camera for capturing a first image and a second camera for capturing a second image, comprising:
performing a video call via a wireless communication unit;
displaying, on a touchscreen, a first preview screen including the first image while the video call is performed;
displaying, on the touchscreen, a second preview screen including the second image at a first region of the first preview screen; and
moving the second preview screen from the first region to a second region of the first preview screen when the second image is changed such that a second person is included in the changed second image instead of a first person that was included in the second image.

13. A method of controlling a mobile terminal comprising a first camera for capturing a first image and a second camera for capturing a second image, the comprising:
displaying a first preview screen including the captured first image;
displaying a second preview screen including the captured second image at a first region of the first preview screen, the second image including more than one object; and
dividing the second preview screen into a first screen and a second screen in response to receiving a touch input via the displayed second preview screen such that the first screen including a first obiect is displayed at a second region of the first preview screen and the second screen including a second obiect is displayed at a third region of the first preview screen.

14. The method of claim 13, wherein the first object corresponds to a first person and the second object corresponds to a second person, the method further comprising:
recognizing a first face and a second face in the second image, wherein the touch input comprises touching the first face or the second face;
displaying, on the touchscreen, the recognized first face in the first screen; and
displaying, on the touchscreen, the recognized second face in the second screen.

* * * * *